US009898217B2

(12) United States Patent
Zhang

(10) Patent No.: US 9,898,217 B2
(45) Date of Patent: Feb. 20, 2018

(54) TWO STAGE MEMORY ALLOCATION USING A CACHE

(71) Applicant: SONICWALL US HOLDINGS INC., Santa Clara, CA (US)

(72) Inventor: Xiangyang Zhang, San Jose, CA (US)

(73) Assignee: SONICWALL INC., Santa Clara, CA (US)

( * ) Notice: Subject to any disclaimer, the term of this patent is extended or adjusted under 35 U.S.C. 154(b) by 0 days.

(21) Appl. No.: 15/596,987

(22) Filed: May 16, 2017

(65) Prior Publication Data

US 2017/0249094 A1    Aug. 31, 2017

Related U.S. Application Data

(63) Continuation of application No. 14/708,110, filed on May 8, 2015, now Pat. No. 9,658,794.

(51) Int. Cl.
| | |
|---|---|
| *G06F 12/00* | (2006.01) |
| *G06F 13/00* | (2006.01) |
| *G06F 3/06* | (2006.01) |
| *G06F 9/52* | (2006.01) |
| *G06F 9/50* | (2006.01) |

(52) U.S. Cl.
CPC .......... *G06F 3/0619* (2013.01); *G06F 3/0604* (2013.01); *G06F 3/0644* (2013.01); *G06F 3/0659* (2013.01); *G06F 3/0673* (2013.01); *G06F 9/5016* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 6,584,554 B1 | 6/2003 | Dahlen et al. | |
| 6,594,667 B2 | 7/2003 | Dahlen et al. | |
| 6,895,490 B1 * | 5/2005 | Moore | G06F 3/0607 365/230.03 |
| 7,246,187 B1 | 7/2007 | Ezra et al. | |
| 7,472,233 B2 | 12/2008 | McKenney et al. | |
| 7,613,870 B2 * | 11/2009 | Bartley | G06F 12/08 711/103 |
| 8,055,873 B2 * | 11/2011 | Chu | G06F 12/0246 707/813 |
| 8,352,673 B2 * | 1/2013 | Chu | G06F 12/0246 365/185.33 |
| 8,626,987 B2 * | 1/2014 | Jung | G06F 12/0246 707/693 |

(Continued)

OTHER PUBLICATIONS

U.S. Appl. No. 14/665,315 Office Action dated Aug. 11, 2016.
U.S. Appl. No. 14/695,681 Office Action dated Apr. 24, 2017.

*Primary Examiner* — Sean D Rossiter
(74) *Attorney, Agent, or Firm* — Polsinelli LLP

(57) ABSTRACT

The presently claimed invention manages memory in a multi-processor system. The presently claimed invention may use a combination of global and local locks when allocating memory and de-allocating memory in a multi-processor system. A method consistent with the presently claimed invention may first receive an allocation of a first memory space in the system memory of a multi-core processing system. The allocation of the first memory space may globally locks the first memory space where the memory space may administered by a software module using one or more local locks.

20 Claims, 7 Drawing Sheets

(56) References Cited

U.S. PATENT DOCUMENTS

| | | | |
|---|---|---|---|
| 8,688,896 B2* | 4/2014 | Nakamura | G06F 12/0246 |
| | | | 711/103 |
| 9,658,794 B2 | 5/2017 | Zhang | |
| 2003/0041173 A1 | 2/2003 | Hoyle | |
| 2003/0236957 A1 | 12/2003 | Miller et al. | |
| 2004/0225742 A1 | 11/2004 | Loalza et al. | |
| 2006/0117316 A1 | 6/2006 | Cismas et al. | |
| 2006/0159109 A1 | 7/2006 | Lamkin et al. | |
| 2007/0150665 A1 | 6/2007 | Arimill et al. | |
| 2008/0320262 A1 | 12/2008 | McKenney et al. | |
| 2010/0192224 A1 | 7/2010 | Ferri et al. | |
| 2010/0275216 A1 | 10/2010 | Crowell et al. | |
| 2012/0089735 A1 | 4/2012 | Attaluri et al. | |
| 2012/0311606 A1 | 12/2012 | Marathe et al. | |
| 2013/0124483 A1 | 5/2013 | Furuhashi et al. | |
| 2013/0290404 A1 | 10/2013 | Rajabi et al. | |
| 2014/0244943 A1 | 8/2014 | Jacobs et al. | |
| 2014/0281138 A1* | 9/2014 | Karamcheti | G06F 12/0246 |
| | | | 711/103 |
| 2014/0304309 A1 | 10/2014 | Diederich et al. | |
| 2014/0344928 A1 | 11/2014 | Sreedharan et al. | |
| 2014/0358863 A1 | 12/2014 | Bennett et al. | |
| 2015/0213259 A1 | 7/2015 | Du et al. | |
| 2016/0132364 A1 | 8/2016 | Huang et al. | |
| 2016/0314147 A1 | 10/2016 | Romine | |
| 2016/0328175 A1 | 11/2016 | Zhang | |

* cited by examiner

TWO STAGE MEMORY ALLOCATION USING A CACHE

CROSS-REFERENCE TO RELATED APPLICATIONS

The present application claims the priority benefit of U.S. patent application Ser. No. 14/708,110 filed May 8, 2015, now U.S. Pat. No. 9,658,794, the disclosure of which is incorporated herein by reference.

BACKGROUND OF THE INVENTION

Field of the Invention

The presently claimed invention is generally related to a managing memory in a multi-processor system. More specifically the presently claimed invention is related to allocating a range of memory addresses to a software process in a computer system.

Description of the Related Art

Conventionally memory that is allocated to a first process running on a computer system must be locked such that another process running on the computer does not overwrite the memory allocated to the first process before the first process has released the lock on the allocated memory. These types of locks are commonly referred to as spin locks. In certain instances when a thread corresponding to process has created a spin lock, the lock may persist longer than the process really needs the spin lock. This is because the period of time that a spin lock is held is not only dependent upon how long a process uses the allocated memory. The period of time that a spin lock is held may also correspond to factors, such as, the number of threads running on the computer system, the architecture and complexity of the memory allocation scheme running at the computer system, and the number of cores in the computer system.

When there are many threads running in a computer system, especially when the computer system includes one or more multi-core processors, the unlocking of memory corresponding to a particular process may be delayed significantly. Delays in releasing spin locks decreases the efficiency of processes running on the computer system. These delays waste the compute cycles in the computer system because a process may have to wait for memory to become available for a thread related to that process to execute code at a processor in the computer system. Current memory allocation schemes, thus, reduce memory allocation efficiency by blocking threads from receiving access to memory quickly after another process has completed using the memory. In certain instances these delays have been known to the system software or a program running on a computer system to abruptly stop functioning (i.e. crash).

What is needed is a system and a method that allows a process to use memory without waiting for a conventional spin lock to be released.

SUMMARY OF THE PRESENTLY CLAIMED INVENTION

The presently claimed invention manages memory in a multi-processor system. Initially a part of memory is allocated to a program with a global lock. The program may then locally lock a portion of the globally locked memory for use by another software process. After providing the local lock, the program may then store a starting address of the locally locked portion of memory in a data structure.

An embodiment of the presently claimed invention may be implemented as a software program (i.e.: a non-transitory computer readable storage medium). The software program may globally lock a first memory space of system memory of a multi-core system. The software program may then receive a first request to locally lock a first portion of the first memory space where the first memory space is of a size that corresponds to a memory size that spans a range of memory addresses from a first starting memory address. The software program may then lock the first portion of memory with a first local lock that includes memory addresses in the first memory space. Next the software program may store the first starting memory address in a first entry of a data structure.

An apparatus of the presently claimed invention may be any computing device that requires memory to be allocated to a processor. The apparatus includes a memory and multiple processors. At least one of the processors executes instructions out of the memory thereby receiving a first allocation of a first memory space of system memory of the multi-core processing system. The first allocation of the first memory space globally locks the first memory space. A first request for locally locking a first portion of memory is also received and the first portion of memory is of a size that corresponds to a memory size that spans a range of memory addresses from a first starting memory address. Execution of the instructions locks the first portion of memory with a first local lock and includes memory addresses in the first memory space. Execution of the instructions also stores the first starting memory address in a first entry of a data structure.

DETAILED DESCRIPTION

Figure 1:
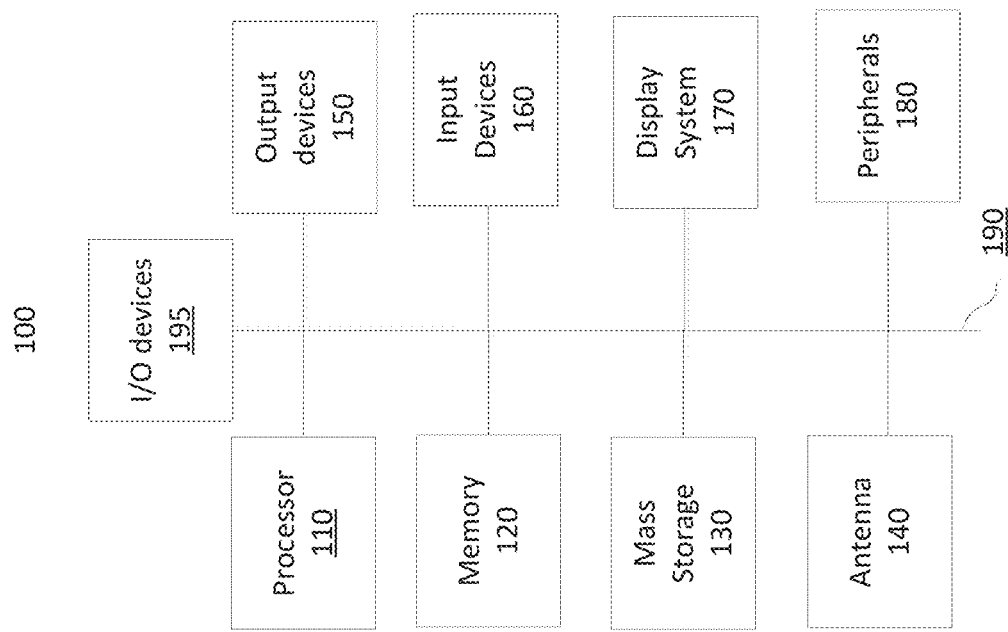
FIG. 1 illustrates a block diagram of a computing device that may be used to implement various embodiments of the presently claimed invention.

The presently claimed invention manages memory in a multi-processor system. The presently claimed invention may use a combination of global and local locks when allocating memory and de-allocating memory in a multi-processor system. After locking allocating and globally locking a portion of system memory, parts of the allocated memory may be allocated to processes running on one or more processors at the multi-processor system using a series of local locks.

The presently claimed invention may globally lock a portion of system memory dynamically at any time, or may globally lock a portion of system memory when the system boots up. When the portion of system memory is allocated at boot time or shortly after boot time, the allocated system memory may be may be maintained for as long as the system is operating. Such an allocated portion of system memory may be referred to as a persistent object because it may persist from boot time until the system is shutdown.

In instances where a portion of system memory of system memory is allocated dynamically, the allocated system memory may be referred to as a temporary (transient) object that may be maintained for as long as it is needed. In these instances the dynamically allocated memory may be released (unlocked globally) when an application program no longer needs the dynamically allocated memory.

The presently claimed invention may also use both a persistent object and a temporary object. This may occur when the memory locations of the persistent memory object are fully utilized and when an application requires additional memory. The presently claimed invention may expand and shrink a total amount of system memory that is allocated to software module and made available to an application program.

Memory locked by a global lock according to the presently claimed invention may not be accessed by other application programs or nodes executing applications not related to a specific type of application that may interact with a software module of the presently claimed invention. The software module may quickly allocate and de-allocated memory using local locks managed by the software module without accessing or waiting for a global memory manager. The presently claimed invention by operating with both global and local locks increases the efficiency of memory allocation to an application program.

Application programs that receive local locks from the software module may receive access to a block of memory in the globally locked portion of system memory where each block allocated may be of the same size (i.e. a set homogeneous memory blocks). The presently claimed invention operates most efficiently when allocating memory using local locks that lock blocks of memory of the same size. When the blocks of memory are the same size, a data structure that maps a process or thread to a specific memory location does not need to track data blocks of different sizes. The presently claimed invention optimizes the execution speed of application programs that store data blocks of the same size. Examples of such application programs include applications that manage: data packets, a secure socket layer session, an endpoint of an Internet protocol security (IPSec) tunnel, network address translation objects, policies or data for a dynamic firewall, and a session in a firewall (such as a state-full firewall session).

The presently claimed invention may manage memory allocation for one or more different types of applications by using one or more software modules consistent with the presently claimed invention. Each different application program may be allocated blocks of memory of a size that corresponds to a size used by each respective different application program.

In certain instances persistent and temporary objects of the presently claimed invention may be maintained in an object list that groups free objects, groups used objects, identifies a minimum number of objects, and that identifies a maximum number of objects. The minimum number of objects may correspond to a minimum set of persistent objects that are initialized at boot time. The maximum number of objects may limit a total number of persistent and transient objects that may exist in system memory at a point in time.

Objects of the presently claimed invention may create or destroy an object cache, may allocate an object to an application program process or thread, or that may free an object. Freeing an object may consist of disassociating the application program process or thread from the memory object, such that another application program process or thread may be associated with the object.

FIG. 1 illustrates a block diagram of a computing device that may be used to implement various embodiments of the presently claimed invention. FIG. 1 illustrates an exemplary computing system 100 that may be used to implement a computing device with the present technology. Note that FIG. 1 is exemplary and that all features shown in the figure may not be included in a system implementing the presently claimed invention. System 100 of FIG. 1 may be implemented in the contexts of the likes of clients and servers. The computing system 100 of FIG. 1 includes one or more processors 110 and memory 120. Main memory 120 may store, in part, instructions and data for execution by processor 110. Main memory 120 can store the executable code when in operation. The system 100 of FIG. 1 further includes mass storage 130, which may include resident mass storage and portable storage, antenna 140, output devices 150, user input devices 160, a display system 170, peripheral devices 180, and I/O devices 195.

The components shown in FIG. 1 are depicted as being connected via a single bus 190. However, the components may be connected through one or more data transport means. For example, processor unit 110 and main memory 120 may be connected via a local microprocessor bus, and the storage 130, peripheral device(s) 180, and display system 170 may be connected via one or more input/output (I/O) buses.

Mass storage device 130, which may include mass storage implemented with a magnetic disk drive, an optical disk drive, FLASH memory, or be a portable USB data storage device. Mass storage device 130 can store the system software for implementing embodiments of the presently claimed invention for purposes of loading that software into main memory 120. The system software for implementing embodiments of the presently claimed invention may be stored on such a portable medium and input to the computer system 100 via the portable storage device.

Antenna 140 may include one or more antennas for communicating wirelessly with another device. Antenna 140 may be used, for example, to communicate wirelessly via Wi-Fi, Bluetooth, with a cellular network, or with other wireless protocols and systems. The one or more antennas may be controlled by a processor 110, which may include a controller, to transmit and receive wireless signals. For example, processor 110 executes programs stored in memory 120 to control antenna 140, transmit a wireless signal to a cellular network, and receive a wireless signal from the cellular network.

The system 100 as shown in FIG. 1 includes output devices 150 and input devices 160. Examples of suitable output devices include speakers, printers, and monitors. Input devices 160 may include a microphone, accelerometers, a camera, and other devices. Input devices 160 may also include an alpha-numeric keypad, such as a keyboard, for inputting alpha-numeric and other information, or a pointing device, such as a mouse, a trackball, stylus, or cursor direction keys. I/O devices 195 include network interfaces, and touch screens. Network interfaces used the presently claimed invention may be any computer network (wired or wireless) known in the art, including, yet are not limited to Ethernet, or 802.11.

Display system 170 may include a liquid crystal display (LCD), LED display, a plasma display, or be another suitable display device. Display system 170 receives textual and graphical information, and processes the information for output to the display device.

Peripherals 180 may include any type of computer support device to add additional functionality to the computer system. For example, peripheral device(s) 180 may include a modem or a router.

The components contained in the computer system 100 of FIG. 1 are those typically found in computing system, such as but not limited to a gateway, a firewall, a desktop computer, a laptop computer, a notebook computer, a netbook computer, a tablet computer, a smart phone, a personal data assistant (PDA), or other computer that may be suitable for use with embodiments of the presently claimed invention and are intended to represent a broad category of such computer components that are well known in the art. Thus, the computer system 100 of FIG. 1 can be a personal computer, hand held computing device, telephone, mobile computing device, workstation, server, minicomputer, mainframe computer, gateway, firewall, or any other computing device. The computer can also include different bus configurations, networked platforms, multi-processor platforms, etc. Various operating systems can be used including but not limited to Unix, Linux, Windows, Macintosh OS, Palm OS, Android OS, and Apple iOS.

Figure 2:
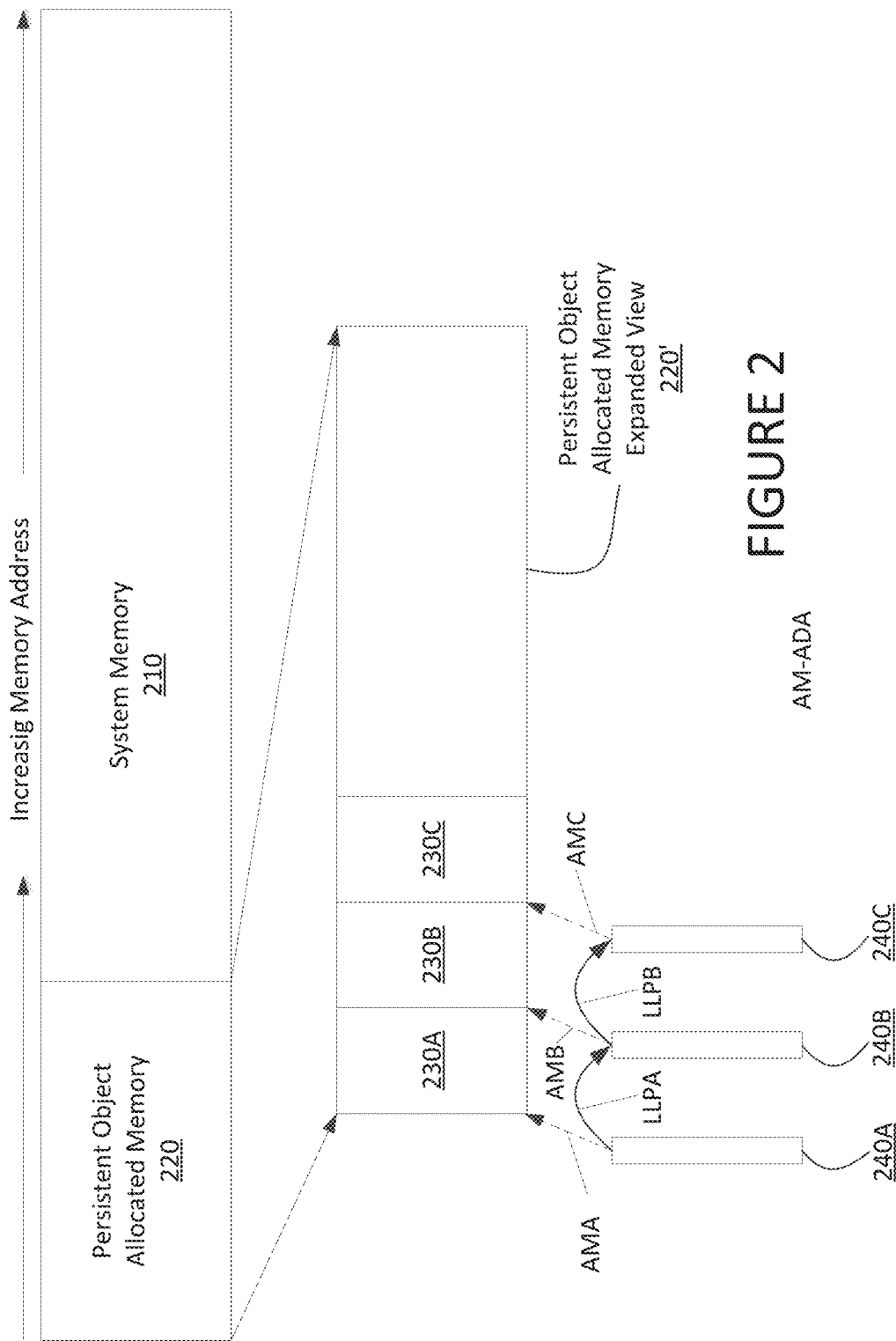
FIG. 2 illustrates a portion of system memory allocated to a persistent memory object.

FIG. 2 illustrates a portion of system memory allocated to a persistent memory object. FIG. 2 includes system memory 210 where a portion of the system memory 210 is allocated to persistent memory object 220. FIG. 2 also includes an expanded view 220' of the persistent memory object. The expanded view 220' of the persistent memory object includes allocated memory blocks 230A, 230B, and 230C. Memory blocks 230A, 230B, and 230C may store data that is associated with an application program. Each memory block 230A, 230B, and 230C may consist of a one or more memory locations in the system memory. When the memory blocks include more than one individual memory location a first memory location may reside at a starting memory address and end at a second memory address. The size of each memory block 230A, 230B, and 230C may be equal.

FIG. 2 also includes elements 240A, 240B, and 240C that may be stored in a data structure. Element 240A includes a first allocated memory address AMA and a pointer LLPA that points to a second element 240B. Element 240B includes a second allocated memory address AMB and a pointer LLPB that points to a third element 240C. Element 240C includes a third allocated memory address AMC. The allocated memory address pointers AMA, AMB, and AMC each point to a starting memory address of memory blocks 230A, 230B, and 230C respectively. The data structure storing memory elements 240A, 240B, and 240C may be a linked list. Whenever a process associated with an application program requests an additional memory block that memory block may be allocated by a software module locally locking an additional memory block according to the presently claimed invention. The software module may then update the data structure after the process requests the additional memory block. The software module may also de-allocate a memory block by unlocking a local lock and by removing an entry from the data structure. Data structures used with embodiments of the presently claimed invention include, yet are not limited to linked lists, and hash tables.

Figure 3:
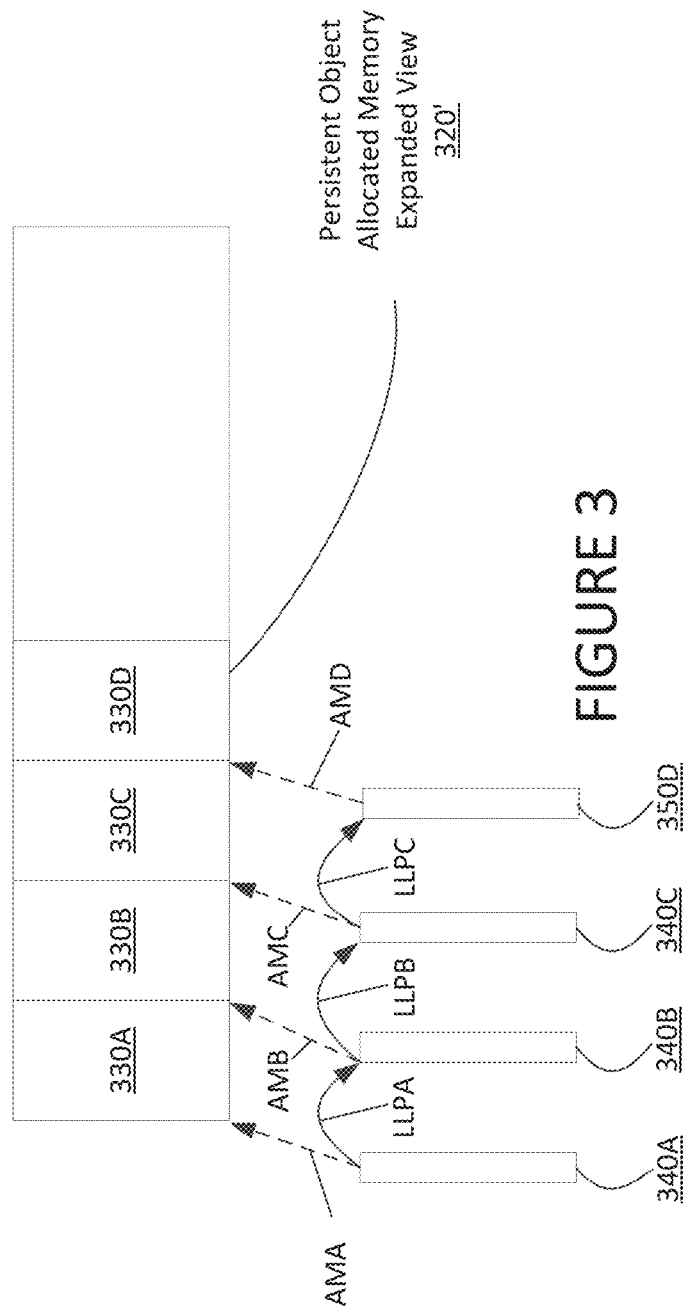
FIG. 3 illustrates an exemplary expanded view of the persistent memory object of FIG. 2 after another element has been added to the data structure of FIG. 2.

FIG. 3 illustrates an exemplary expanded view of the persistent memory object of FIG. 2 after another element has been added to the data structure of FIG. 2. The expanded view 320' of the persistent memory object in FIG. 3 includes four allocated data blocks 330A, 330B, 330C, and 330D where FIG. 2 includes only three. Element 340A includes a first allocated memory address AMA and a pointer LLPA that points to a second element 340B. Element 340B includes a second allocated memory address AMB and a pointer LLPB that points to a third element 340C. Element 340C includes a third allocated memory address AMC and a pointer LLPC that points to a fourth element 340D. Element 340D includes a third allocated memory address AMD. The allocated memory address pointers AMA, AMB, AMC, and AMD each point to a starting memory address of memory blocks 330A, 330B, 330C, and 330D respectively.

Figure 4:
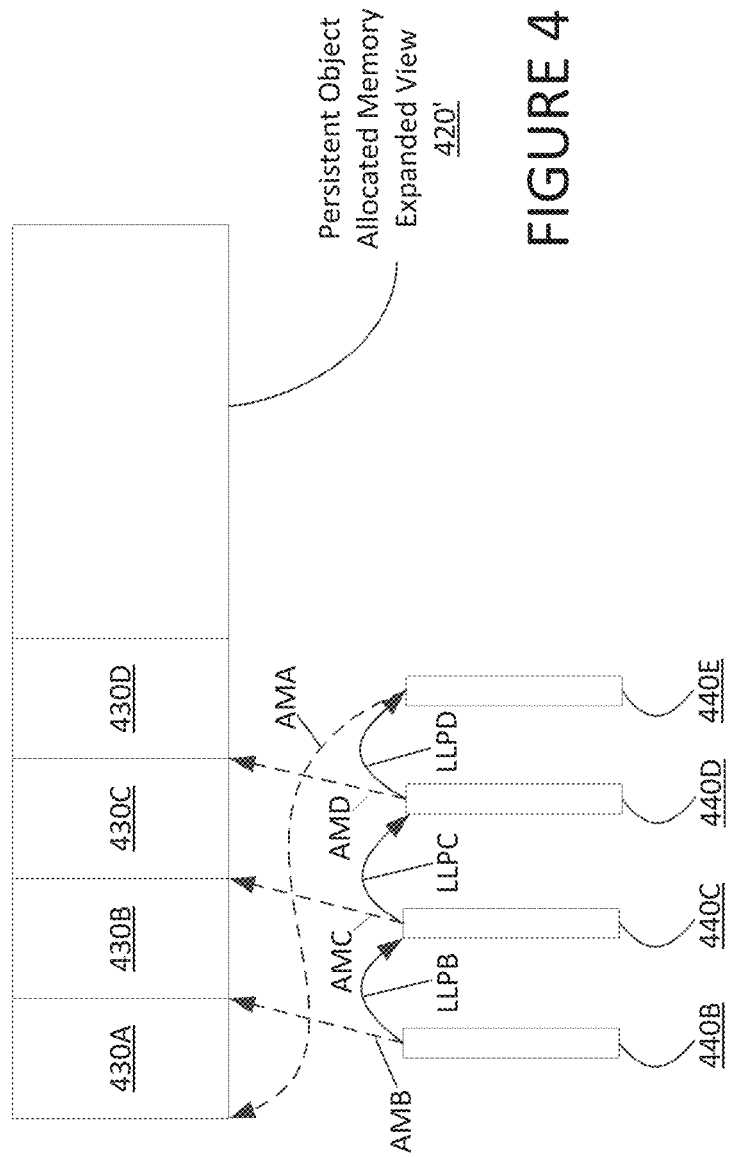
FIG. 4 illustrates an expanded view of the persistent object of FIG. 2 after an element has been removed and another element added to the data structure of FIG. 2.

FIG. 4 illustrates an expanded view of the persistent object of FIG. 2 after an element has been removed and another element added to the data structure of FIG. 2. The expanded view 420' of the persistent memory object includes four allocated data blocks 430A, 430B, 430C, and 430D. Notice that element 440E includes a first allocated memory address AMA. Element 440B includes a second allocated memory address AMB and a pointer LLPB that points to a third element 440C. Element 440C includes a third allocated memory address AMC and a pointer LLPC that points to a fourth element 440D. Element 440D includes a third allocated memory address AMD and a pointer that points to the fourth element 440E of the data structure of FIG. 4. The allocated memory address pointers AMA, AMB, AMC, and AMD each point to a starting memory address of memory blocks 430A, 430B, 430C, and 430D respectively. FIG. 4 illustrates that the presently claimed invention may allocate a data block (i.e. 430A) to an application program that was previously locked and then unlocked by a local lock.

Figure 5:
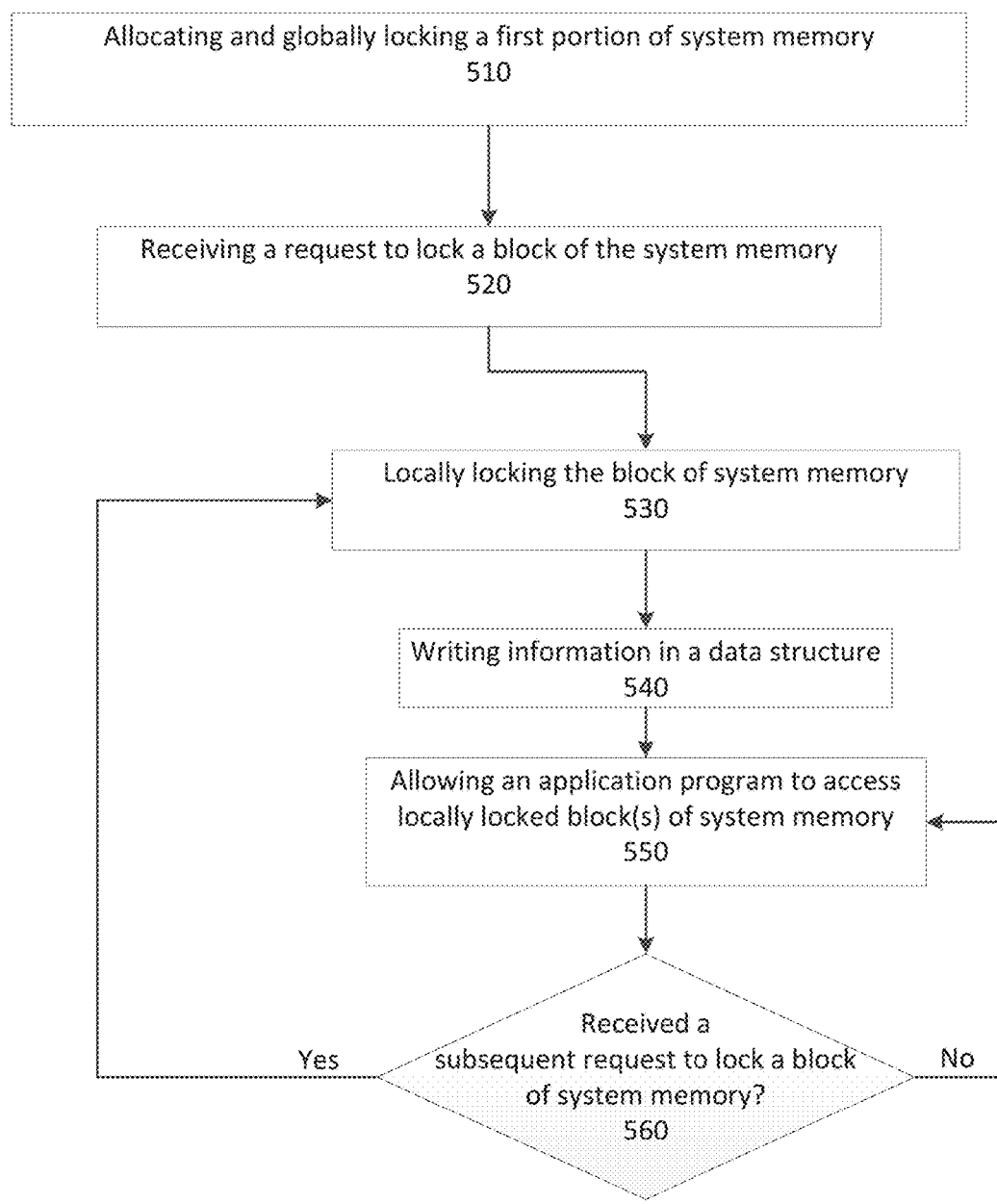
FIG. 5 illustrates a flow chart of an exemplary software module consistent with the presently claimed invention.

FIG. 5 illustrates a flow chart of an exemplary software module consistent with the presently claimed invention. The flow chart of FIG. 5 begins with step 510 where a portion of system memory may be allocated by globally locking the portion of system memory. Then in step 520 a request to lock a block of the system memory is received. Next in step 530 the block of system memory is locally locked by the software module. In step 540 software module may create or update a data structure by writing information into the data structure. Step 550 of the flow chart allows an application program to access the locally locked block(s) of system memory that have been allocated to the application.

Step 560 of FIG. 5 is a determining step that identifies whether a subsequent request to lock a memory block has been received by the software module. When a subsequent request has been received in step 560, program flow moves back to step 530 where an additional block of system memory may be locally locked. When the subsequent request has not been received in step 560, program flow moves back to step 550 where the application may access the locally locked blocks of system memory.

Figure 6:
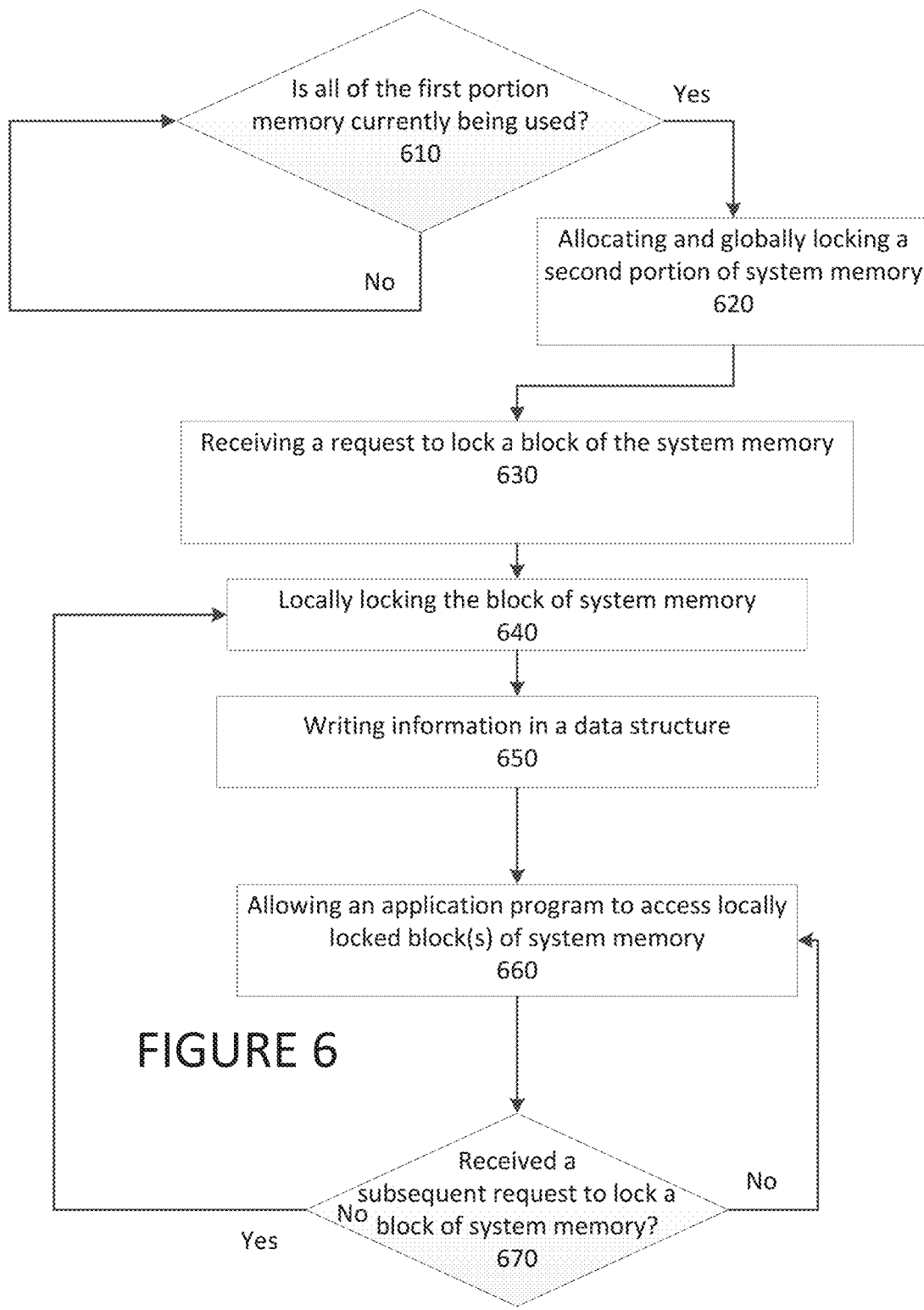
FIG. 6 illustrates a second flow chart of a software module according to the presently claimed invention.

FIG. 6 illustrates a second flow chart of a software module according to the presently claimed invention. Step 610 of FIG. 6 determines whether all of the memory in the first portion of memory allocated in the first step of FIG. 5 are currently being used, when no, program flow remains in step 610. When all of the memory in the first portion of memory are currently being used, program flow moves to step 620. Step 620 allocates and globally locks a second portion of the system memory.

Next in step 630 a request is received from an application program to lock a block of the system memory. Then in step 640 the block of system memory is locally locked by the software module. In step 650 software module may create or update a data structure by writing information into the data structure. Step 660 of the flow chart allows an application program to access the locally locked block(s) of system memory that have been allocated to the application.

Step 670 of FIG. 6 is a determining step that identifies whether a subsequent request to lock a memory block has been received by the software module. When a subsequent request has been received in step 670, program flow moves back to step 640 where an additional block of system memory may be locally locked. When the subsequent request has not been received in step 670, program flow moves back to step 660 where the application may access the locally locked blocks of system memory.

Figure 7:
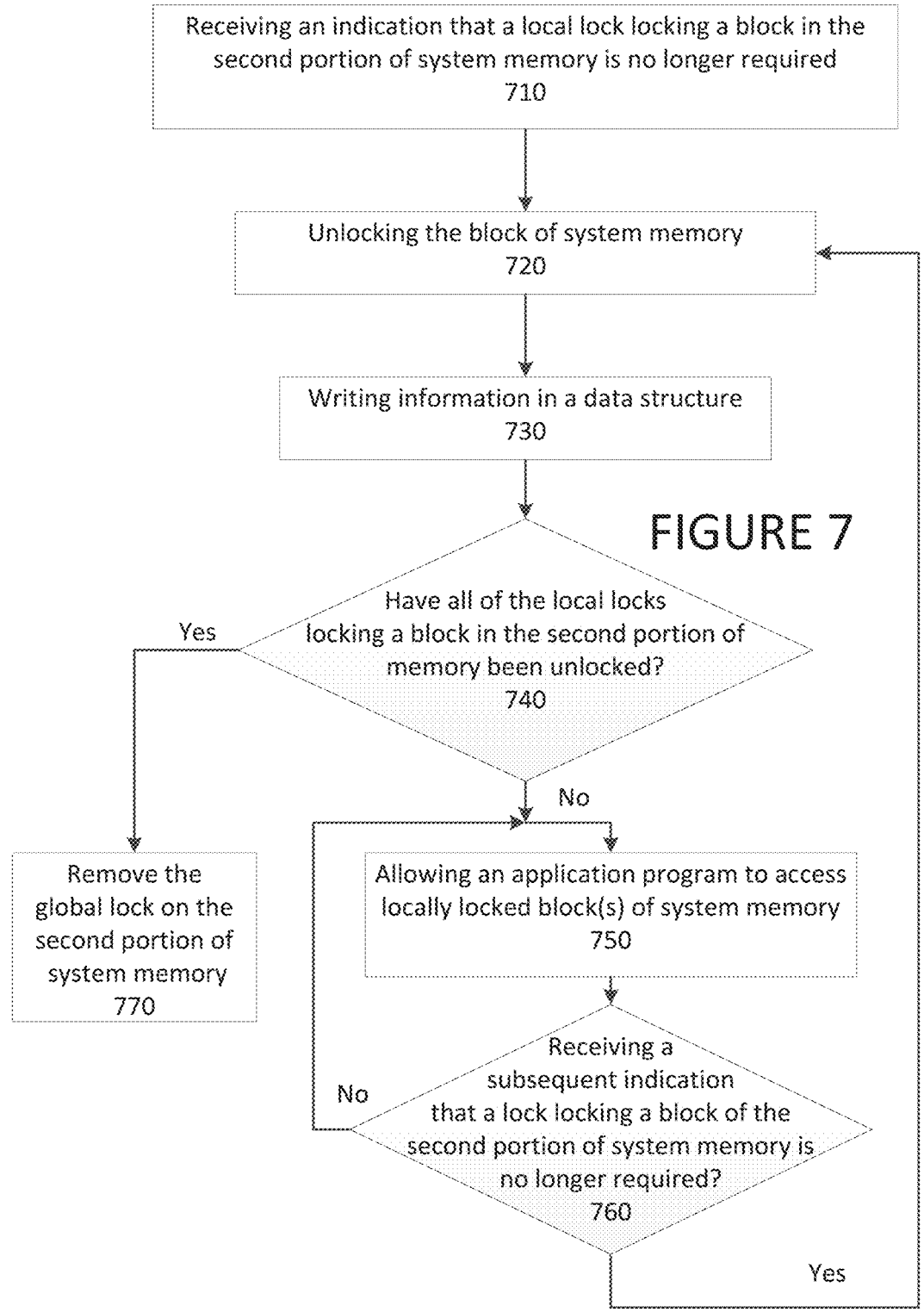
FIG. 7 illustrates a third flow chart of a software module according to the presently claimed invention.

FIG. 7 illustrates a third flow chart of a software module according to the presently claimed invention. Step 710 of the flow chart of FIG. 7 receives an indication that a local lock locking a block in the second portion of system memory is no longer required. Then in step 720 the block that is no longer required is unlocked. Next in step 730 information is written to a data structure that removes reference to the unlocked block.

Step 740 is a determination step that determines whether all local locks locking memory in the second portion of memory have been removed, when yes, program flow moves to step 770 where a global lock locking the second portion of system memory is removed. When step 740 determines that all of the locks locking memory in the second portion of memory have not been removed program flow moves to step 750 where an application program is allowed to access the locally locked blocks of system memory. Then in step 760 determines whether a subsequent indication that a lock locking a block of the second portion of system memory is no longer required, when yes, program flow moves back to step 720 where the lock is unlocked. When an indication that a lock of the second portion of system memory has not been received, program flow moves back to step 750 where the application program may access the locally locked blocks of system memory. FIGS. 6 and 7 illustrate that when a first portion of system memory is fully utilized, a second portion of system memory may be allocated and administered as long as an application program requires additional memory. When the second portion of system memory is no longer required, a global lock locking the second portion of system memory may be removed.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description are not intended to limit the scope of the presently claimed invention or to limit the scope of embodiments of the presently claimed invention. The present descriptions are intended to cover alternatives, modifications, and equivalents consistent with the spirit and scope of the disclosure.

What is claimed is:

1. A method for managing memory allocation, the method comprising:

globally locking at least one portion of a memory accessible to processors of a multi-core processing system;

locally locking at least one part of the portion of globally locked memory, the locally locked part of the globally locked memory portion being accessible by at least one of the processors of the multi-core processing system, wherein the locally locked part of the globally locked memory portion stores data associated with one or more application programs; and accessing by the at least one processor the locally locked part of the globally locked memory portion when performing a function associated with at least one of the application programs.

2. The method of claim 1, further comprising:

receiving a first request concerning access to the memory and associated with a first application program;

locally locking a first part of a first portion of the globally locked memory based on the first request associated with the first application program; and accessing by the first application program the locally locked first part of the first portion of the globally locked memory.

3. The method of claim 2, further comprising:

receiving a first request concerning access to the memory and associated with a second application program;

locally locking a first part of a second portion of the globally locked memory based on receiving the first request associated with the second application program; and accessing by the second application program the locally locked first part of the second portion of the globally locked memory.

4. The method of claim 2, further comprising:

receiving a second request concerning access to the memory and associated with the first application program;

locally locking a second part of the first portion of the globally locked memory based on receiving the second request associated with the first application program; and accessing by the first application program the locally locked second part of the first portion of the globally locked memory.

5. The method of claim 2, further comprising:

receiving a second request concerning access to the memory and associated with the first application program;

identifying that the first portion of the globally locked memory is fully utilized;

allocating a second portion of the memory;

globally locking the second portion of the memory; and locally locking a first part of the second portion of the memory after globally locking the second portion of the memory.

6. The method of claim 1, wherein the locally locking the at least one part of the portion of the globally locked memory comprises:

locally locking a first part of the globally locked memory with a first local lock, wherein the first local lock is associated with a first starting memory address;

storing the first starting memory address in a data structure;

locally locking a second part of the globally locked memory with a second local lock, wherein the second local lock is associated with a second starting memory address; and storing the second starting memory address in the data structure.

7. The method of claim 2, further comprising limiting access to the first portion of the portion of the globally locked memory to the first application program based on a first global lock being associated with the first application program.

8. A non-transitory computer-readable storage medium having embodied thereon a program executable by one or more processors of a multi-processor system for managing memory allocation, the method comprising:
  globally locking at least one portion of a memory accessible to processors of a multi-core processing system;
  locally locking at least one part of the portion of globally locked memory, the locally locked part of the globally locked memory portion being accessible by at least one of the processors of the multi-core processing system, wherein the locally locked part of the globally locked memory portion stores data associated with one or more application programs; and
  accessing by the at least one processor the locally locked part of the globally locked memory portion when performing a function associated with at least one of the application programs.

9. The non-transitory computer-readable storage medium of claim 1, wherein the program further comprises instructions executable to:
  receive a first request concerning access to the memory and associated with a first application program;
  locally lock a first part of a first portion of the globally locked memory based on the first request associated with the first application program; and
  access by the first application program the locally locked first part of the first portion of the globally locked memory.

10. The non-transitory computer-readable storage medium of claim 9, wherein the program further comprises instructions executable to:
  receive a first request concerning access to the memory and associated with a second application program;
  locally lock a first part of a second portion of the globally locked memory based on receiving the first request associated with the second application program; and
  access by the second application program the locally locked first part of the second portion of the globally locked memory.

11. The non-transitory computer-readable storage medium of claim 9, wherein the program further comprises instructions executable to:
  receive a second request associated with the first application program of the one or more application programs to access the memory;
  locally lock a second part of a first portion of the one or more portions of the globally locked memory based on receiving the second request associated with the first application program; and
  allow access to the first application program the locally locked second part of the first portion of the globally locked memory.

12. The non-transitory computer-readable storage medium of claim 9, wherein the program further comprises instructions executable to:
  receive a second request concerning access to the memory and associated with the first application program;
  identify that the first portion of the globally locked memory is fully utilized;
  allocate a second portion of the memory;
  globally lock the second portion of the memory; and
  locally lock a first part of the second portion of the memory after globally locking the second portion of the memory.

13. The non-transitory computer-readable storage medium of claim 8, wherein locally locking the at least one part of the at least one portion of the globally locked memory comprises:
  locally locking a first part of the globally locked memory with a first local lock, wherein the first local lock is associated with a first starting memory address;
  storing the first starting memory address in a data structure;
  locally locking a second part of the globally locked memory with a second local lock, wherein the second local lock is associated with a second starting memory address; and
  storing the second starting memory address in the data structure.

14. The non-transitory computer-readable storage medium of claim 9, wherein the program further comprises instructions executable to limit access to the first portion of the portion of the globally locked memory to the first application program based on a first global lock being associated with the first application program.

15. A system for managing memory allocation, the system comprising:
  a memory comprising at least one portion that is globally locked, wherein the at least one portion includes at least one part that is locally locked, and wherein the locally locked part stores data associated with one or more application programs; and
  one or more multi-core processors that accesses the locally locked part of the globally locked portion when performing a function associated with at least one of the one or more application programs.

16. The system of claim 15, further comprising a network interface that receives a first request concerning access and associated with a first application program, wherein a first part of a first portion of the globally locked memory is locally locked based on the first request associated with the first application program, and wherein execution of the first application program by the processors accesses the locally locked first part of the first portion of the globally locked memory.

17. The system of claim 16, wherein the network interface receives a first request concerning access and associated with a second application program, wherein a first part of a second portion of the globally locked memory is locally locked based on receiving the first request associated with the second application program; and wherein execution of the second application program by the processor s accesses the locally locked first part of the second portion of the globally locked memory.

18. The system of claim 16, wherein the network interface receives a second request concerning access and associated with the first application program, wherein a second part of a first portion of the globally locked memory is locally locked based on receiving the second request associated with the first application program; and wherein execution of the first application program by the processors accesses the locally locked second part of the first portion of the globally locked memory.

19. The system of claim 16, wherein the network interface receives a second request concerning access and associated with the first application program; and wherein the processors execute instructions stored in memory to:

identify that the first portion of the globally locked memory is fully utilized;
allocate a second portion of the memory;
globally lock the second portion of the memory; and
locally lock a first part of the second portion of the memory after globally locking the second portion of the memory.

20. The system of claim 15, wherein the processors locally lock the at least one part of the portion of the globally locked memory by:
locally locking a first part of the globally locked memory with a first local lock, wherein the first local lock is associated with a first starting memory address;
storing the first starting memory address in a data structure;
locally locking a second part of the globally locked memory with a second local lock, wherein the second local lock is associated with a second starting memory address; and
storing the second starting memory address in the data structure.

* * * * *